US012664077B1

(12) United States Patent
Will

(10) Patent No.: US 12,664,077 B1
(45) Date of Patent: Jun. 23, 2026

(54) MULTI-COMPONENT APPLICATION TEST FRAMEWORK

(71) Applicant: Amazon Technologies, Inc., Seattle, WA (US)

(72) Inventor: Andrew Will, Tempe, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 17/809,877

(22) Filed: Jun. 29, 2022

(51) Int. Cl.
*G06F 11/3668* (2025.01)

(52) U.S. Cl.
CPC ...... *G06F 11/3696* (2013.01); *G06F 11/3692* (2013.01)

(58) Field of Classification Search
CPC ................... G06F 11/36–3696; G06F 11/3698
See application file for complete search history.

(56) References Cited

U.S. PATENT DOCUMENTS

| | | | |
|---|---|---|---|
| 8,191,048 B2 | 5/2012 | Parthasarathy et al. | |
| 8,799,875 B2 * | 8/2014 | Ziegler | G06F 11/3696 |
| | | | 717/135 |
| 9,058,177 B2 * | 6/2015 | Chiluvuri | G06F 8/20 |
| 10,922,216 B1 * | 2/2021 | Kumar | G06F 11/3684 |
| 11,693,748 B2 * | 7/2023 | Mogilevskiy | G06F 11/203 |
| | | | 714/4.11 |

| | | | |
|---|---|---|---|
| 2012/0084754 A1 * | 4/2012 | Ziegler | G06F 11/3696 |
| | | | 717/124 |
| 2014/0337816 A1 * | 11/2014 | Chiluvuri | G06F 8/20 |
| | | | 717/107 |
| 2021/0279150 A1 * | 9/2021 | Mogilevskiy | G06F 11/203 |

OTHER PUBLICATIONS

Tsai, By, et al., Iterative design and testing within the software development life cycle, Software Quality Journal, No. 6 [online], 1997 [retreived Jul. 24, 2024], Retreived from Internet: <URL: https://link.springer.com/article/10.1023/A:1018528506161>, pp. 295-308.*

(Continued)

*Primary Examiner* — Todd Aguilera
(74) *Attorney, Agent, or Firm* — Robert C. Kowert; Kowert, Hood, Munyon, Rankin & Goetzel, P.C.

(57) ABSTRACT

A multi-component application test framework tests components of an application out of order and without all components being ready for test. Descriptions for each component of an application are received and stored. Definitions for waypoints (code or test data substitutes for actual components net yet submitted) are received and stored. An endpoint lookup directory is initialized with waypoint endpoints for each component. A particular component is submitted for test and the test deployed. The particular component dynamically looks up endpoints for input/output dependencies for the particular component with other components and activates inactive waypoints acting as substitutes for components not-yet-submitted. The test completes, and for a passing test, the endpoint directory is updated to point to the particular component for other component dependencies instead of waypoints, effectively merging the particular component with others dependent on it. A similar process is repeated until all components are merged.

19 Claims, 13 Drawing Sheets

(56)                       References Cited

OTHER PUBLICATIONS

Leung, H., A Framework for Regression Testing, University of Alberta [online], 1992 [retrieved Jul. 24, 2024], Retrieved from Internet: <URL: https://era.library.ualberta.ca/items/c6306b4e-8c10-4521-b254-68e42f9fb92b>, whole document.*

Teixiera, P., et al., "Nock", npm [online], 2017 [retrieved Apr. 3, 2025], Retrieved from Internet: <URL: https://www.npmjs.com/package/nock/v/9.3.3>, whole document.*

Anonymous, "Ensure All Nock Interceptors are Used", neverendingqs [online], 2017 [retrieved Nov. 4, 2025], Retrieved from Internet: <URL: https://blog.neverendingqs.com/2017/03/13/ensure-all-nock-interceptors-are-used.html>, whole document.*

Heap, M., "Ensure all nock mock interceptors are used", Michael Heap [online], Jan. 2021 [retrieved Nov. 4, 2025], Retrieved From Internet: <URL: https://michaelheap.com/nock-all-mocks-used/>, whole document.*

* cited by examiner

| Component | Status | Address | Dependencies | Waypoint-in | Waypoint-out |
|---|---|---|---|---|---|
| Flow control | planned | - | Data check | Test usage generation | Flow validator |
| Data check | released | datacheck.abccorp.com | Initial data analysis | Test usage generation | not applicable |
| Initial data analysis | released | IDS.abccorp.com | Model builder, Application of model | not applicable | Analysis output validation |
| - | | | | | |
| - | | | | | |
| Machine-learning model | build under test | MLM.abccorp.com | Model builder | not applicable | MLM model validator |
| Console | passed | console.abccorp.com | Results | Model results test data | GUI output validator |

*FIG. 3*

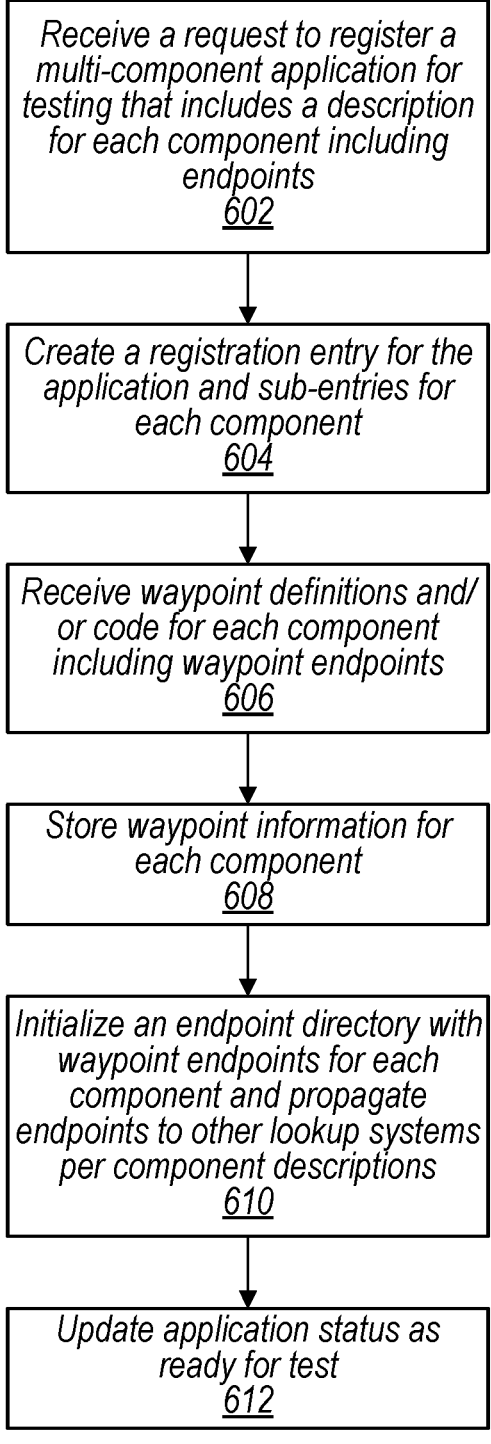

*Receive a request to register a multi-component application for testing that includes a description for each component including endpoints*
*602*

*Create a registration entry for the application and sub-entries for each component*
*604*

*Receive waypoint definitions and/ or code for each component including waypoint endpoints*
*606*

*Store waypoint information for each component*
*608*

*Initialize an endpoint directory with waypoint endpoints for each component and propagate endpoints to other lookup systems per component descriptions*
*610*

*Update application status as ready for test*
*612*

*FIG. 6*

MULTI-COMPONENT APPLICATION TEST FRAMEWORK

BACKGROUND

Testing systems and techniques (especially for complex systems) involve significant coordination and manual processes. Additionally, for systems with multiple component dependencies, tests can be blocked while waiting for every component to be ready to accept traffic. Furthermore, once tests are underway, a single failure can require days and weeks of triage and remedy before retesting can occur. Over that time, the number of components and interdependencies only increases, further adding complexity (and additional manual processes) to the coordination of the testing process. In addition, for at least some systems, execution of end-to-end tests can be blocked until all components are in place.

BRIEF DESCRIPTION OF THE DRAWINGS

FIG. 3 illustrates a data structure describing various characteristics of components of a multi-component application being tested by a multi-component application test framework, according to some embodiments.

FIG. 6 illustrates a process diagram for registering a multi-component application for test in a multi-component application test framework, according to some embodiments.

Figure 1:
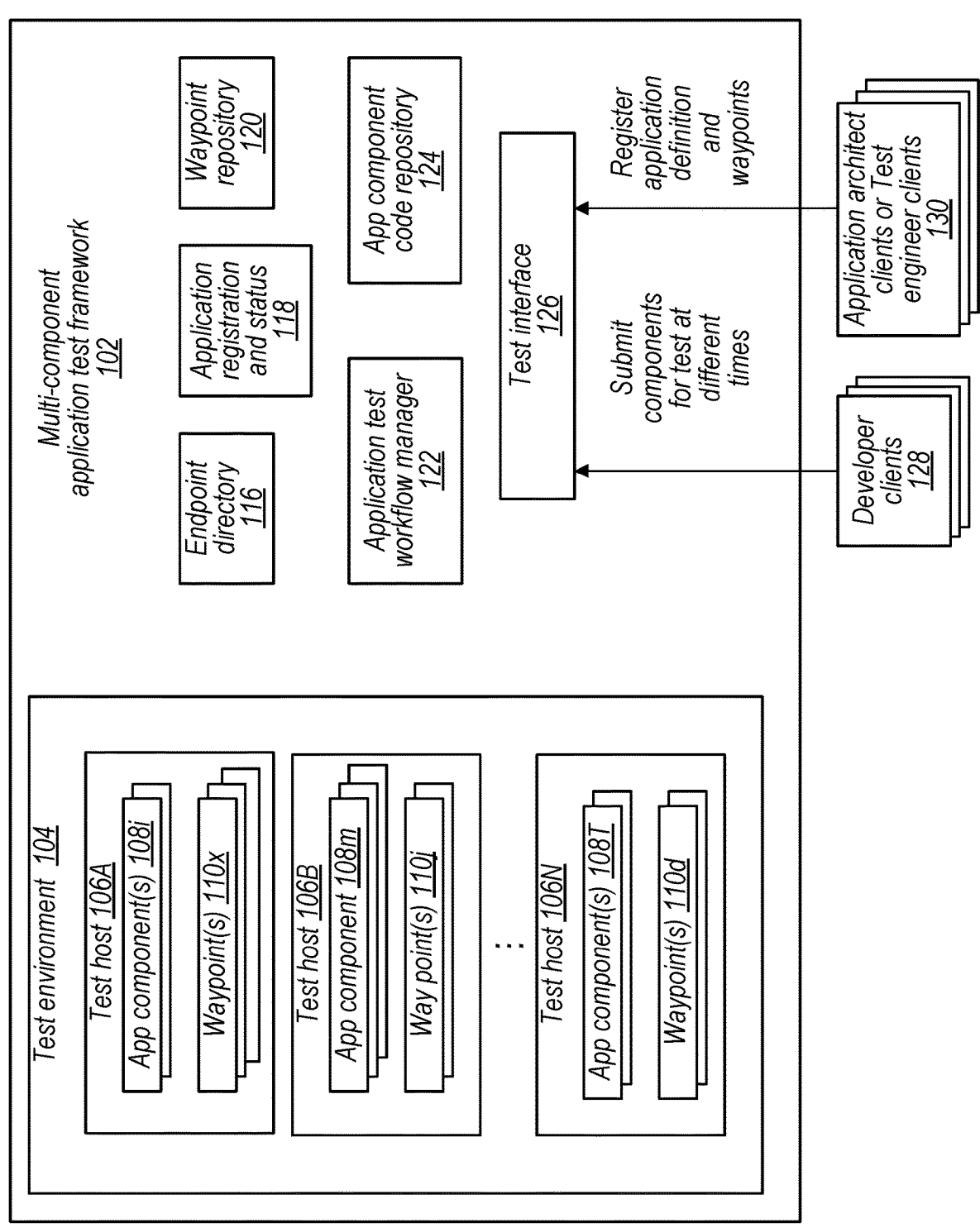
FIG. 1 illustrates a logical architecture of a multi-component application test framework, according to some embodiments.

While the solution is described herein by way of example for several embodiments and illustrative drawings, those skilled in the art will recognize that the solution is not limited to the embodiments or drawings described. It should be understood, that the drawings and detailed description thereto are not intended to limit the solution to the particular form disclosed, but on the contrary, the intention is to cover all modifications, equivalents and alternatives falling within the spirit and scope of the present solution. Headings used herein are for organizational purposes only and are not meant to be used to limit the scope of the description.

DETAILED DESCRIPTION OF EMBODIMENTS

As discussed in more detail below, systems and methods for embodiments of a multi-component application test framework to test multi-component applications is disclosed. At least some embodiments automate qualification of a complex system under test before it has been completely built (e.g., a system with multiple components that may not be available for test all at once and may be made available for test out-of-order, or similar). Various techniques and technical features are implemented by the multi-component application test framework, such as synthetic data injection and test observation points, sometimes referred to as waypoints, herein.

In an example, a complex system may be defined as a graph of components (sometimes referred to as subsystems, herein) connected by interfaces. In embodiments, a waypoint is a type of interface between two components. Waypoints may be strategically chosen to isolate different component parts of the system that are delivered independently (e.g., by different software teams, and/or in an unpredictable order). A fractional segment of the complex system located between two waypoints may be referred to as a subsystem or component, in embodiments.

As adjacent components are independently qualified by automated tests that reside on a subsystem's waypoints, the components are merged to form a larger component, and the waypoint is removed from the test qualification. Over time, this process reduces the number of waypoints and thus the surface area of where tests inject and observe. The number of segments is reduced over test iterations for each submitted component until one segment remains at which point the system in its entirety has been qualified.

In a particular example, a multi-component application test framework receives a test description for a multi-component application to be tested. The description may identify (or specify) one or more components of a multi-component application, and/or identify dependencies between the components. The framework may determine (e.g., based on the identified dependencies) input and output waypoints for individual components. In some embodiments, one or more input waypoints may simulate one of the components that provides input to one or more other ones of the components. In some embodiments, one or more output waypoints simulate one of the components that receives output from one or more other ones of the components, or from another waypoint. In embodiments, a waypoint does not have to simulate the entire component that provides or receives data/communications to/from another component. For example, a waypoint may simulate the output functionality (if the waypoint is an input waypoint) or receiving functionality (if the waypoint is an output waypoint).

In embodiments, the framework may receive different components for testing at different times. Each component may be tested using other components or waypoints for its dependencies according to the endpoint information when the component is submitted for testing, in some embodiments.

In embodiments, the framework may set endpoint information for components that have not been successfully tested to point to corresponding waypoints, in an Endpoint directory, for example. The framework may receive (e.g., via a Test interface) and deploy (e.g., to a test host) a particular component for test. In embodiments, the particular component looks up, during runtime, endpoints for its component dependencies (e.g., from the Endpoint directory). The endpoints point to either waypoints or to successfully tested ones of the plurality of components, in embodiments.

In some embodiments, to simulate one of the components that provides input to one or more other ones of the components, a respective input waypoint may synthesize test data to provide as input to the one or more other components, or replay captured production data as input to the one or more other components, as non-exhaustive examples.

In embodiments, the test framework updates endpoints for components in response to a successful test of the particular application component. The endpoints are updated to point to the particular component instead of an input or output waypoint corresponding to the particular component, in embodiments. In embodiments, the multi-component application test framework may deactivate, responsive to successful testing of the particular application component, waypoints corresponding the particular component.

Possible benefits of some embodiments of such a multi-component application test framework (sometimes referred to herein as a test system or test framework) may be that the test system is flexible with respect to entry point (e.g., where in the application to start the test during test setup) and exit point (result evaluation). To support some such functionality, input state and data can be synthesized. Components that are missing can be stubbed using a mocking/test double framework, in some embodiments.

In at least some embodiments, it is contemplated that the framework performs a continuous or semi-continuous execution of the application such that components whose build is in progress will continually receive traffic. There may not be a single "test phase" for the application (and/or stack of resources implementing the application) but rather a continual evaluation of components, in some embodiments, such as whenever another component becomes available for testing-via submission through the Test interface, for example.

In some embodiments, the multi-component application test framework generates, responsive to unsuccessful testing of the particular application component, a report of test failures and leaves waypoints corresponding to the particular application component in place so that the components dependent on the particular component will interact with respective ones of the waypoints corresponding to the particular application component for testing.

In embodiments, the multi-component application test framework may, responsive to successful testing of the particular application component: determine whether any active waypoints remain for dependencies between the plurality of application components, continue application testing if any active waypoints remain for dependencies between the plurality of application components, and report successful completion of application testing if no active waypoints remain for dependencies between the plurality of application components.

It is contemplated that in some embodiments, respective ones of the output waypoints verify the output from one or more other ones of the components according to test criteria. Waypoints may be used as input until the corresponding output of the component passes the test (determining whether a test has been passed may include comparing test criterion to verify a successful test, in embodiments).

In embodiments, the multi-component application test framework may, responsive to unsuccessful testing of the particular application component, generate a report of test failures and leave waypoints corresponding to the particular application component in place so that the ones of the plurality of components dependent on the particular component will interact with respective ones of the waypoints corresponding to the particular application component for testing.

It is contemplated that issues causing a component to fail a test may be addressed quickly and automatically. For example, failures may be logged and alerts sent to the most likely source of a solution (e.g., a developer, application architect or test engineer, etc.).

Attention is now brought to the figures. Generally, components of a multi-component application test framework illustrated in block diagrams 1, 4, 5, 8 and 9 may perform some or all of the functionality illustrated in process diagrams 6, 7A and 7B, in accordance with dependency graphs 2A, 2B, 2C, 2D and the Endpoint directory illustrated in FIG. 3. The techniques may be referred to as application component qualification automation, in some embodiments, for example. It is contemplated that in at least some embodiments, more or less of the functionality may be performed by different ones of the components and that not all features are necessary, in at least some embodiments.

FIG. 1 illustrates an architecture of a multi-component application test framework, according to some embodiments. Generally, one of more of the illustrated components of the multi-component application test framework 102 (carried out by hardware and/or services depicted in FIG. 8 or 9, for example, perform the functionality depicted in flow diagrams 6, 7A and 7B. The Test environment 104 (e.g., alpha, beta or gamma target environments) may be implemented outside of or separate from the Multi-component application test framework 102 (e.g., by a Test environment service, illustrated in FIG. 8, described below), in embodiments.

In the illustrated embodiment, during test setup for testing a particular application with the framework 102, using the techniques disclosed herein, a Test interface 126 receives registration information for an application definition and waypoints (e.g., from an application architect clients or test engineer clients 130). Generally, the application definition may include a description of all of the components of the particular application as well as a description of interdependencies among the components of the application. The definition may also include a definition of waypoints to be used for testing of the application, in some embodiments.

The framework may also receive, via Test interface 126, components submitted for test. In embodiments, it may not be necessary for all of the components to be submitted together or at once. Components may be submitted for different iterations of the test at different times (an out of order); and the test iteration for one submitted component may be performed prior to or after a test iteration for a different submitted component, for example. Such a feature frees developer clients 128 from coordinating with one another, allowing developer clients 128 to submit respective components for test at any time in any order, for example.

The framework 102 is illustrated with Application registration and status data store 118 (e.g., populated via the Test interface 126, described above). Such a data store 118 may store entries for every component of an application (for every component of multiple applications, in some embodiments) that indicate component status such as pending successful test, failed test, etc. as well as dependencies (e.g., as illustrated in FIG. 3, described below). The framework 102 is also illustrated with Waypoint repository 120 (e.g., populated via the Test interface 126, described above). Generally, waypoints are code (e.g., a custom synthetic data generator) or script run in place of components that are not yet submitted nor tested as successful. The framework 102 is illustrated with Application code repository 124 (e.g., populated via the Test interface 126, described above) that acts as a data store for the component code being tested for at least some of the components of the application. The framework 102 is also illustrated with Endpoint directory 116. Generally, the Endpoint directory 116 is initially populated (e.g., via the Test interface 126, described above) and then updated by the Application test workflow manager 122 as various test outcomes cause merging of waypoints into qualified macro components (illustrated in FIGS. 2A-2D, described below). Merging of components is generally performed by updating endpoints, in embodiments. As the tests are run, the Endpoint directory 116 gets updated to reflect, for any application component, whether an endpoint points to a waypoint or to the corresponding application component, in embodiments. An endpoint (an address to obtain data from or to provide data to, for example) may refer or point to a location of an actual component that has successfully passed testing, or a waypoint, in embodiments. In embodiments, an endpoint is an address.

Application test workflow manager 122 manages execution of the test workflow, in embodiments. When components are run for test, input/output dependencies are looked up in the Endpoint directory 116 for each dependency to obtain the correct endpoint for that particular test (endpoints may change for different tests of different components, for example). In the illustrated example, Application test workflow manager 122 directs testing of Application component(s) 108i on Test host 106A using Waypoints 110X (e.g., using waypoints determined from a lookup operation performed by the component at runtime on Endpoint directory 116). Different components 108i of an application may be run on a single test host or different components 108i, 108m, 108T may be run across various different test hosts 106A, 106B, 106N, in embodiments. In some embodiments, Application test workflow manager 122 may manage execution of components for multiple applications across multiple test hosts, in parallel, or in at least a partially-overlapping fashion, for example.

As the application component 108 is tested on one or more of the Test hosts 106 (computer hardware, perhaps running virtual machines, running any number of components and/or waypoints) the component looks up endpoints in the Endpoint directory 116 and follows the dependencies that are found in the lookup. Such an arrangement decouples the type of endpoint (e.g., an address for a component or for a waypoint) from the implementation code of the component (the component itself does not need to be manually updated to indicate that the endpoint is an actual component or waypoint, in embodiments).

FIGS. 2A-2D illustrate changing endpoint dependencies among components of a multi-component application being tested by a Multi-component application test framework, according to some embodiments. FIGS. 2A-2D illustrate the following components. Flow control 302, Data check 304, Initial data analysis 306, Application of model 308, Results, 310, Reporting 312, Model builder 314, Statistical model 316. Machine learning model 318, Alarms 320, and Console 322.

FIGS. 2A-2D illustrate definitions for a series of strategic "waypoints" (e.g., seams between major application components (sometimes called subsystems)) that define test injection and test results, for example. Components are independently testable in a continual fashion, in embodiments. As contiguous components or contiguous macro components (groups of components may be referred to as macro components) are successful, the contiguous components are merged into one macro component, and the process moves outward expanding component relationships of the end-to-end test definition to cover a larger footprint of the application with tested components. FIGS. 2A-2D illustrate expanding the boundaries of the macro components until there is one successfully tested macro component representing the end-to-end application.

Figure 2A:
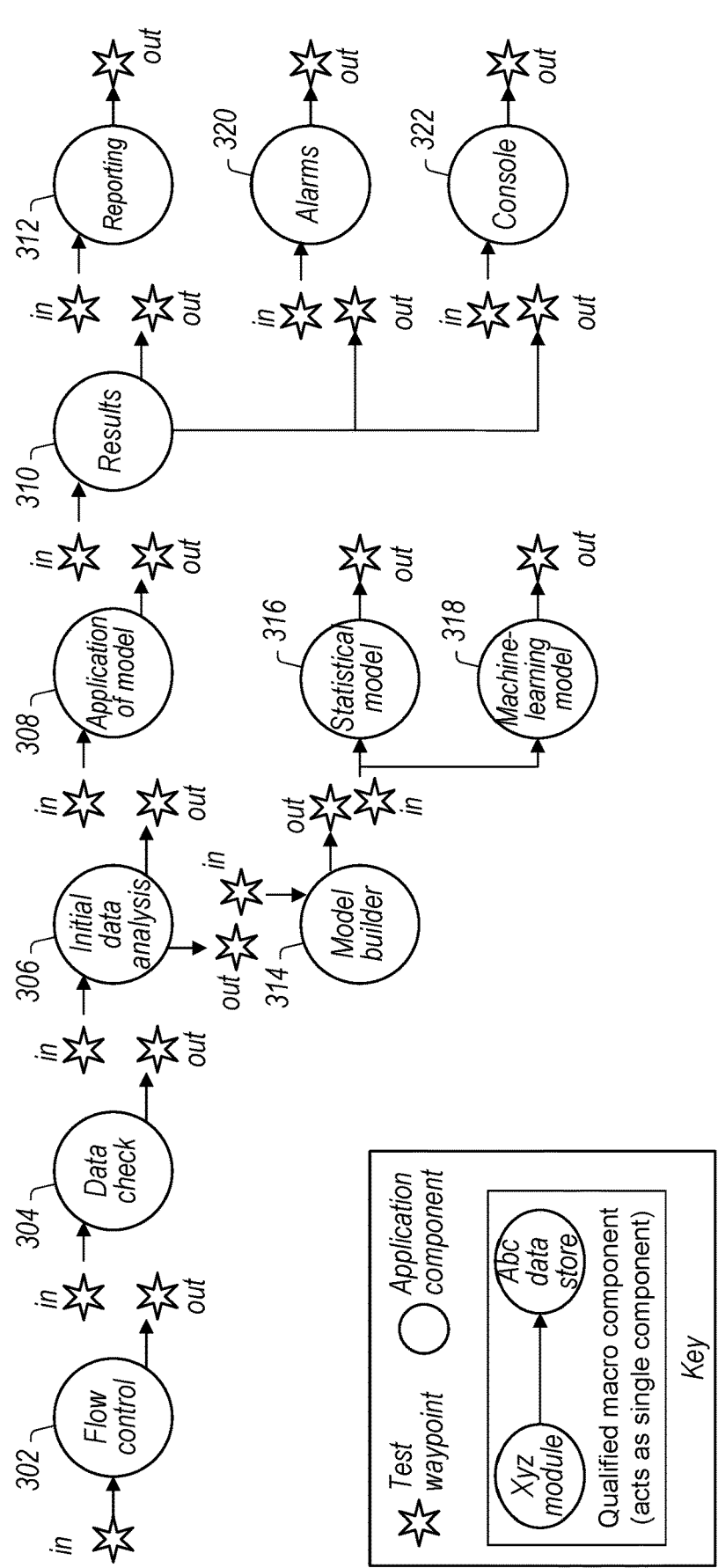
FIGS. 2A-2D illustrate changing endpoint dependencies among components of a multi-component application being tested by a multi-component application test framework, according to some embodiments.
Figure 2B:
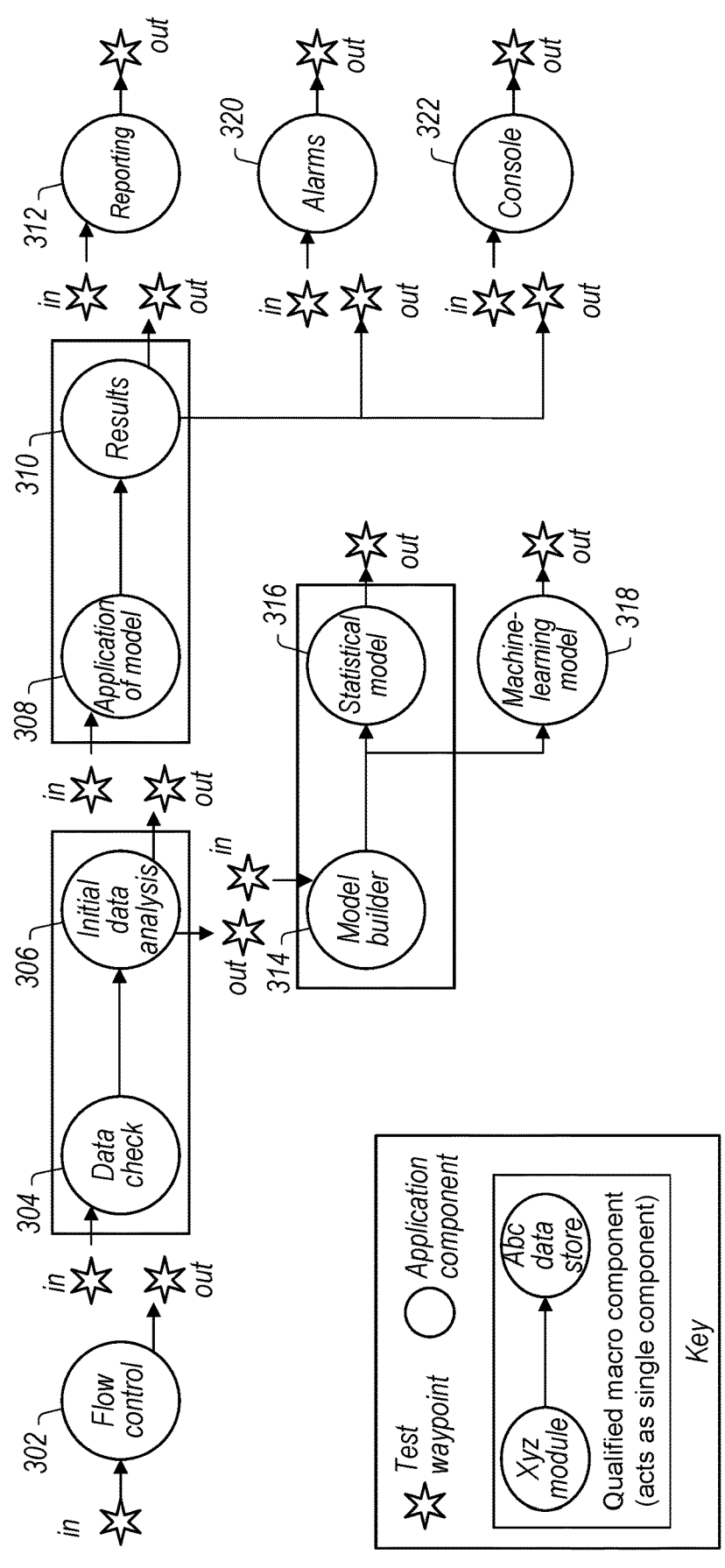
Figure 2C:
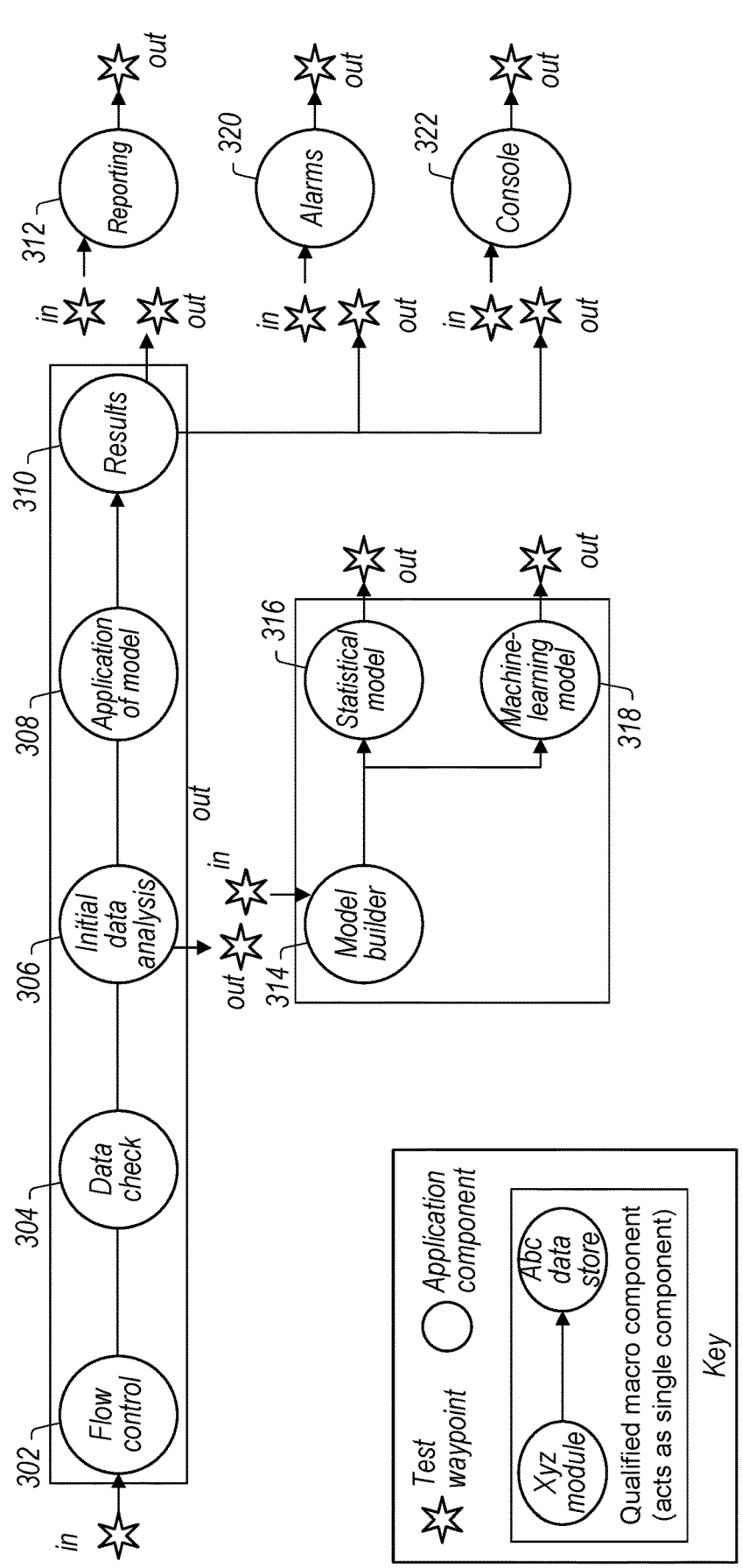
Figure 2D:
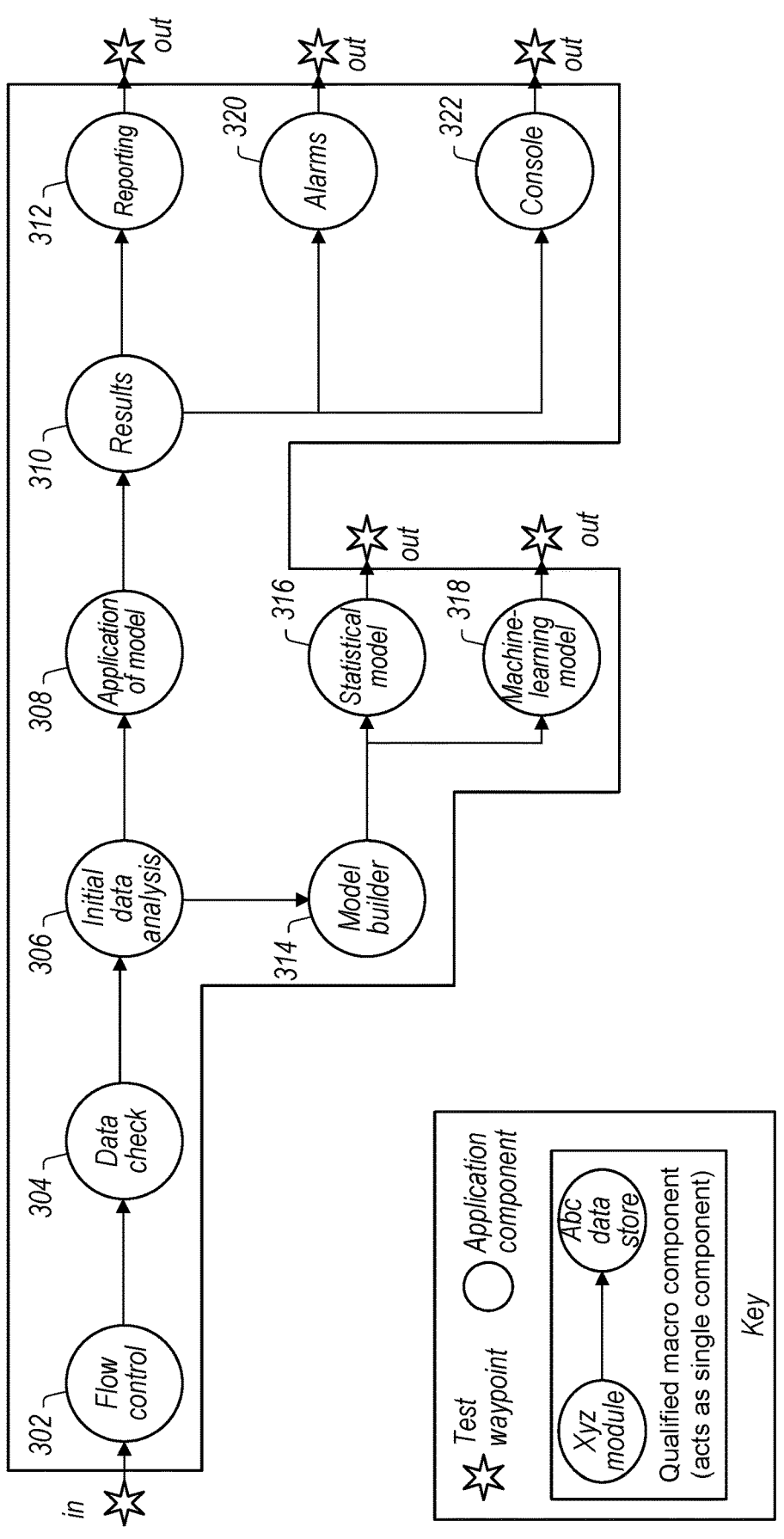

In FIGS. 2A-2D application components are illustrated with at least one input test waypoint and one output test waypoint, although some components are illustrated with more than one output waypoint (it is contemplated that some components may have more than one input waypoint, in embodiments). The area between some components includes an output waypoint from one component and an input waypoint to a next component. It is contemplated that because this is a testing scenario, the output of one component may be producing errors and may not be suitable as input to the next component until testing has shown the output passes the test parameters. FIG. 2B illustrates that when testing has qualified two contiguous components, the waypoints in-between the contiguous components may be updated (e.g., in the Endpoint directory 116) with the address for the actual components in place of the corresponding waypoints that acted as stand-ins for the components. FIG. 2C illustrates that the process continues with additional test runs as additional actual components are submitted for test at different times and in various out-of-order sequences. FIG. 2D illustrates that eventually all of the test waypoints in-between components are replaced with actual components.

There are a number of example techniques that may be implemented for introducing a waypoint as a temporary stand-in for a real component. In embodiments, no one technique is the best for all situations, but analysis of various options may yield the most successful qualification for a given situation.

Synthetic Data

In embodiments, formal interface contracts may define a schema that describe the form of communication that can take place, and the schema regulates and limits the shape of data (e.g., a datagram might contain a "value" field with a positive or negative integer type and with up to four digits of precision). One approach is to work within the boundaries of the schema, and randomly choose a type and value. While relatively simple and able to cover a wide range of inputs, this approach does not generally yield data that semantically matches actual customer traffic patterns and there is some logic to build in order to determine what the appropriate response for a random input would be.

Another approach is to use machine learning techniques, training the data by observing actual exchanges of inputs, outputs, and side effects from another working system. While there is a higher fidelity of resemblance to customer patterns, the drawback of this approach is two-fold: added complexity in building and maintaining models, and the difficulty of covering use cases that are unique in the system under test (i.e., patterns of usage that do not exist in the working system used for training the model).

Replay of Actual Production Data

Sampling actual production traffic is yet another technique for testing a candidate software component. It has known inputs, outputs and/or side effects. One drawback of this approach is that fuzzy matching usually needs to be employed (e.g., to ignore differences in inputs or outputs based on time of day). A more significant drawback of this approach is a need to ensure that the build-up of state across a series of inputs can be captured in a consistent way. For example, if the source creates an entity, updates it, and then deletes it, that same sequence of operations needs to be replayed.

Mocked Data and Expectations

Using a mocking (test double) framework behind a communications interface is another method. But it may require the most manual level of effort. In this approach, waypoints are programmed to initiate a test of the component being qualified, using directly modeled test data. This "observation" waypoint verifies that the component's outputs and side effects are as expected.

In embodiments described herein endpoints are configurable and at least some features describe herein may facilitate injection of mock code components and/or generation of synthetic data. Construction of waypoints for each segment may vary in complexity and feasibility. In some embodiments, use of waypoints provide value even without building all waypoints necessary for an end-to-end test (it may not be necessary to build out waypoints for every component.

FIG. 3 illustrates a data structure describing various characteristics of components of a multi-component application being tested by a Multi-component application test framework, according to some embodiments. The illustrated data structure includes, as non-exhaustive examples, columns for component status (e.g., planned, released, build under test, passed, etc.), component address, component dependencies (either input and/or output dependencies) and waypoint-in and waypoint-out.

It is contemplated that waypoints may emerge naturally at inter-component boundaries, for example. The boundaries may align with well-defined software interfaces (examples of a formal interface are a service application program interface (e.g., API), a message queue, a storage bucket containing objects, etc.). Upon commencement of construction of a new multi-component system (e.g., implemented via a stack of resources) a testing team responsible for validation (sometimes referred to as qualification) of the stack creates a data structure (e.g., in the Application registration and status data store 118, including a data structure similar to the data structure in FIG. 3) of components and dependencies that define the overall structure of the system or application. In embodiments, the Application registration and status data store 118 also defines the waypoints used to exercise each component for testing. In a particular example, "in" waypoints initiate communication with the component under test, and "out" waypoints may be used to verify the component's outputs and system side effects. In the initial state of the system or application-under-test, there may be very few components that have been built and are ready for integration. Use of the waypoints facilitates end-to-end testing of at least some group of components for the application, even though not all of the components are yet available to test, in embodiments.

Figure 4:
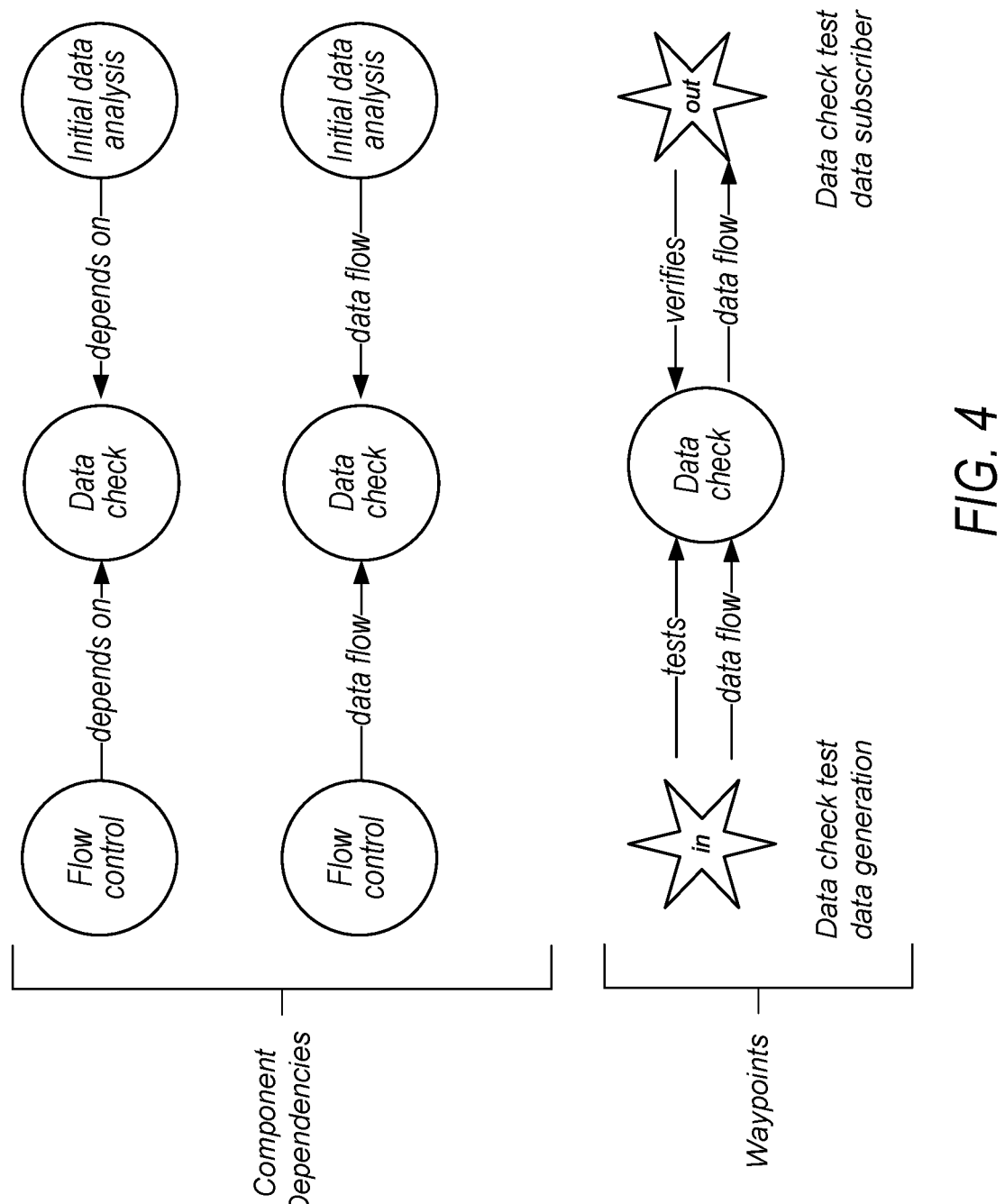
FIG. 4 illustrates data flows and dependencies among components and waypoints of a multi-component application being tested by a multi-component application test framework, according to some embodiments.

FIG. 4 illustrates data flows and dependencies among components and waypoints of a multi-component application being tested by a Multi-component application test framework, according to some embodiments. FIGS. 2A-2D illustrate that a graph with directed edges can be derived from a directory structure in FIG. 3, such that adjacent components can be merged (and their waypoints eliminated) as the components are submitted for testing and pass the test instance. FIG. 4 illustrates that, in some embodiments, there are at least two types of edges: dependency edges (e.g., illustrated which component initiates communication with another component) as well as data flow (illustrates the primary flow of information from one component to another). The directionality of these edges is allowed to vary independently. Considering one component from the previous table in isolation, Data check in this example, the component's relationships with its adjacencies can be seen.

Those adjacent components can be substituted with "waypoint" test fixtures that carry out tests and observe the outputs and side effects of the component under test.

In embodiments, component dependencies can be in either direction and may depend on where the waypoints are. A component might be dependent upon the waypoint for input or for output, in embodiments. When a component runs, the component looks up the endpoints (e.g., addresses or other indications of locations of waypoints or components) to obtain data or to provide output, for example.

As components pass individual tests, the coverage between waypoints expands, and the system's directory structure is updated to reflect a smaller number of active waypoints. For example, FIG. 3 illustrates a system where both Data check and Initial data analysis components have been qualified after component testing.

Figure 5:
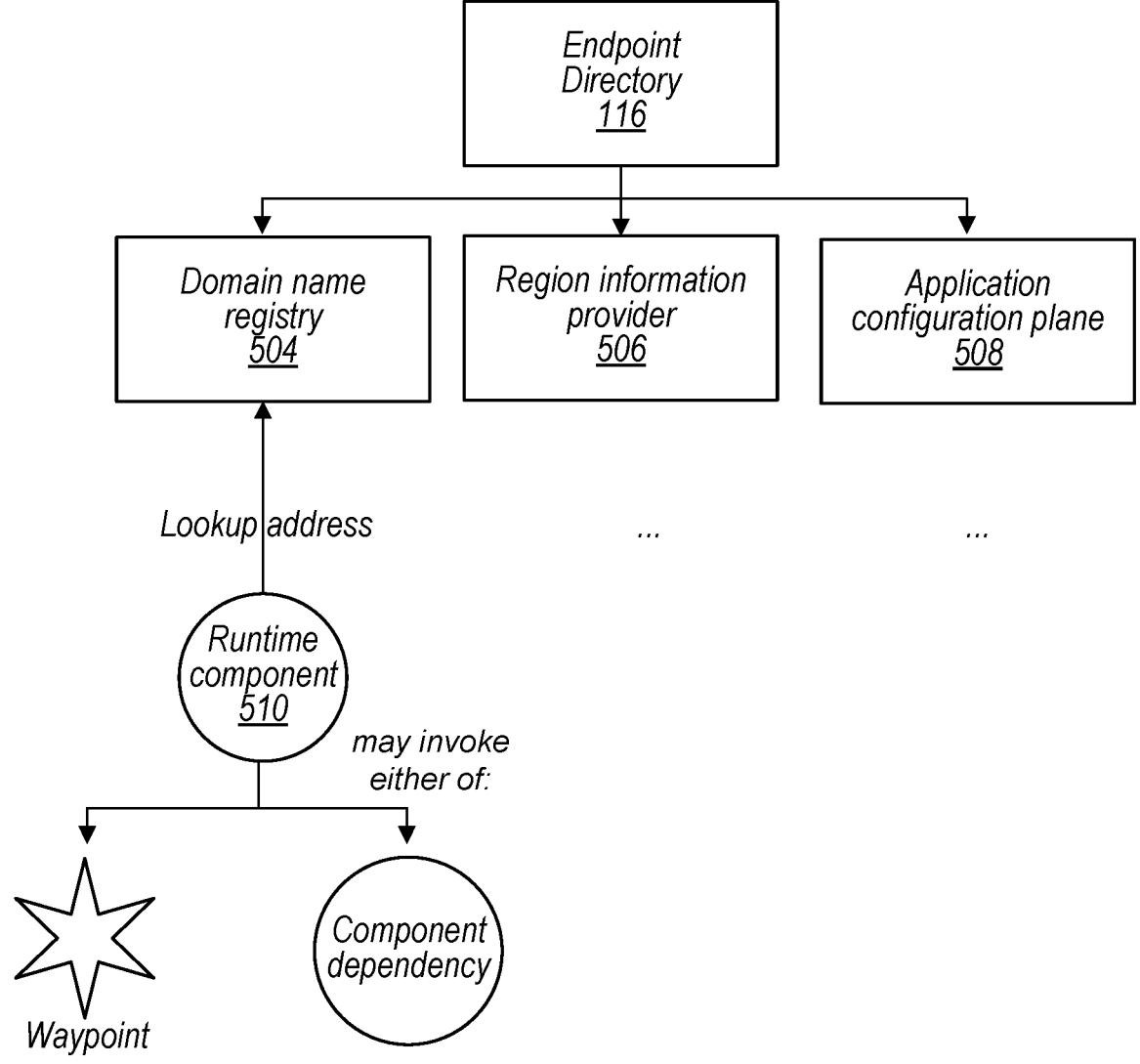
FIG. 5 illustrates various sources of endpoint information for a multi-component application being tested by a multi-component application test framework, according to some embodiments.

FIG. 5 illustrates various sources of endpoint information for a multi-component application being tested by a Multi-component application test framework, according to some embodiments. FIG. 5 illustrates Endpoint Directory 116, Doman name registry 504, Region information provider 506, Application configuration plane 508, and Runtime component 510. In embodiments, a component interface (or corresponding interface of a waypoint that simulates the component) may be implemented as an "address" (e.g., a universal resource locator (URL), IP address or other network address or locator, or the like). In embodiments, an address is a type of endpoint (endpoints may be used, in a test construct or test framework, to reference components, or are referenced by other components or some other entity for communication). In practice, these addresses may take different forms, for example webservice http communications originate by resolving a service's Internet domain using a domain name system (DNS). But other types of communication are also contemplated. For example, some types of communication happen asynchronously through features such as message queues or object buckets, where such a feature's address is identified in a manner specific to a particular service provider. In embodiments, each software component may leverage a different technology.

Sometimes, relationships are hard-coded between components (e.g., the addresses) in static configuration. In some embodiments herein, dynamic discovery of addresses is adopted. In embodiments, the addresses can be registered in different systems suitable for each service. For example, using the Endpoint directory 116 as the authoritative store, as waypoints are defined (or replaced by true components), their addresses are published to one or more component registries (e.g., Domain name registry 504, Region information provider 506, Application configuration plane 508) such that every component can discover the addresses of its adjacent dependencies without having to understand whether that dependency is a simulated component (a waypoint) or the actual software component.

In embodiments, Endpoint directory 116 is initialized with waypoints (e.g., block 610, described below). A test component is tested, validated and merged. Merged may mean that the Endpoint directory is updated to swap out addresses to the waypoints corresponding to the tested component with addresses for the validated components, in embodiments. Another component is received and tested using the actual component instead of the waypoint and the process repeats until all components have passed testing, in embodiments.

FIG. 6 illustrates a process diagram for registering a multi-component application for test in a Multi-component application test framework, according to some embodiments. The registration process may be performed via one or more components illustrated in FIG. 1, in accordance with the dependency graphs 2A-2D, Endpoint directory 116, and Application registration and status data store 118 illustrated in FIG. 3, in some embodiments.

At block 602, a request to register a multi-component application for testing is received (e.g., via Test interface 126 from an Application architect client or Test engineer client 130). The request includes a description for each component of the application and may include endpoints. At block 604, a registration entry is created for the application along with sub-entries for each component (e.g., in Application registration and status data store 118). Waypoint definitions and/or code for each component including waypoint entries are received (block 606) (e.g., via Test interface 126 from Developer clients 128) and stored (e.g., in Application registration and status data store 118) for each component (block 608). At block 610, an Endpoint directory 116 is initialized with waypoint endpoints for each component and the endpoints are propagated to other lookup systems per the component descriptions (e.g., as in FIG. 5, described above). The application status is updated as ready for test (block 612) in the illustrated embodiment.

Figure 7A:
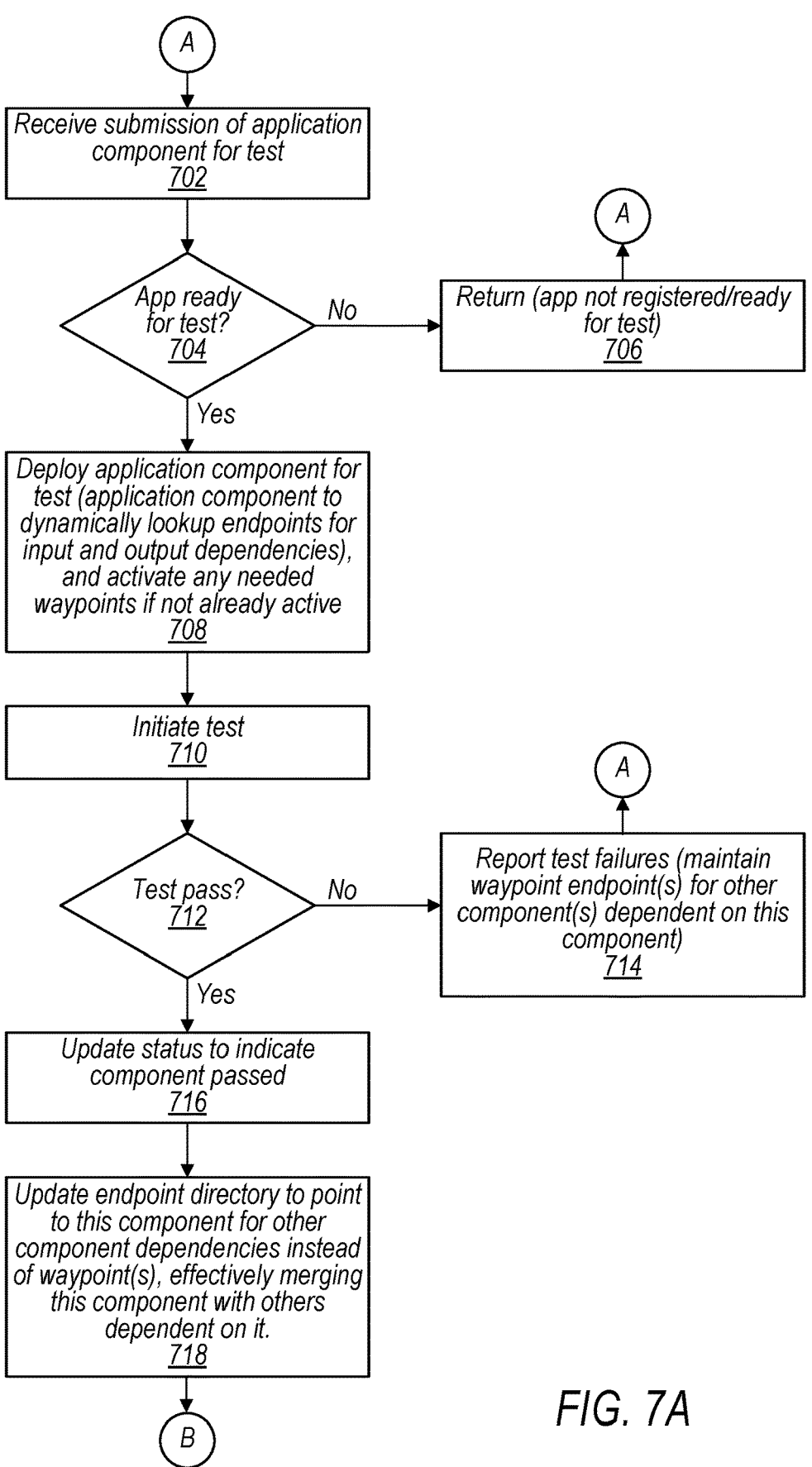
FIGS. 7A and 7B illustrate techniques for testing a multi-component application in a multi-component application test framework, according to some embodiments.
Figure 7B:
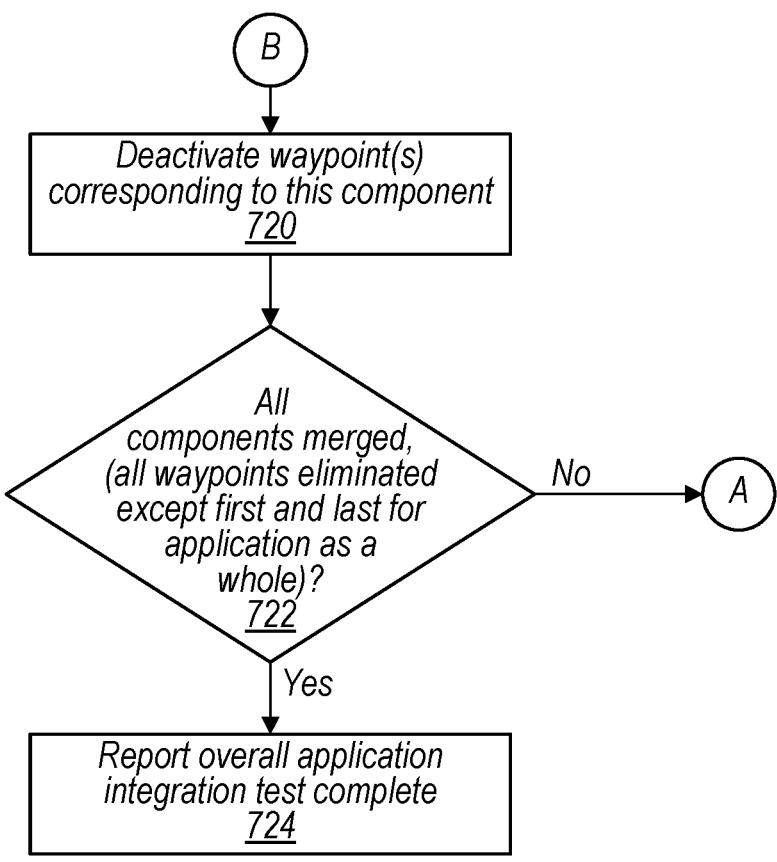

FIGS. 7A and 7B illustrate techniques for testing a multi-component application in a Multi-component application test framework, according to some embodiments. The techniques may be performed via one or more components illustrated in FIG. 1, in accordance with the dependency graphs 2A-2D, Endpoint directory 116, and Application registration and status data store 118, illustrated in FIG. 3, in some embodiments.

In embodiments, components may be submitted and tested whenever ready, in any order, whether or not other related components have been submitted or not. There is no need for coordinating testing between actual components, in some embodiments. Any component group can be tested with waypoints in place of the other not-yet submitted components, in embodiments.

At block 702 submission of an application component for test is received (e.g., via Test interface 126 from Developer clients 128). The Application test workflow manager 122 determines whether the application is ready for test (block 704). For the first component, all the other components will be substituted with waypoints, for the test. If not ready (block 704, No) the process returns to A (e.g., the application is not registered or not ready for test) (block 706). If ready (block 704, yes) the application component for test is deployed and the application component dynamically looks-up endpoint for input and output dependencies, and activates any needed waypoints if not already active (block 708) (e.g., kicking off upstream waypoint to generate test data as input for the component under test. The test is initiated (block 710). If the component does not pass the test (block 712, no) the test failure is reported (block 714) (and waypoint endpoint(s) for other component(s) dependent on this component are maintained). If the component passes the test (block 712, yes) the component status is updated to indicate the component passed (e.g., in the Application registration and status data store 118) (block 716) and the Endpoint directory 116 is updated to point to this component for other component dependencies instead of waypoint(s), effectively merging this component with other(s) dependent on it (block 718). At block 720 waypoint(s) corresponding to this component are deactivated. For example, other components may be using this component for input (or output), so the waypoint is deactivated and the validated component is used, instead. At block 722, a determination whether all components are merged is made (e.g., all waypoints are eliminated except first waypoints and last waypoints for application as a whole (see FIG. 2D)). If not (block 722, No) the process returns to block 702 (e.g., waiting for submission of another application component for test). If all components are merged (block 722, Yes) the Application test workflow manager 122 reports overall application integration test as complete (block 724).

Figure 8:
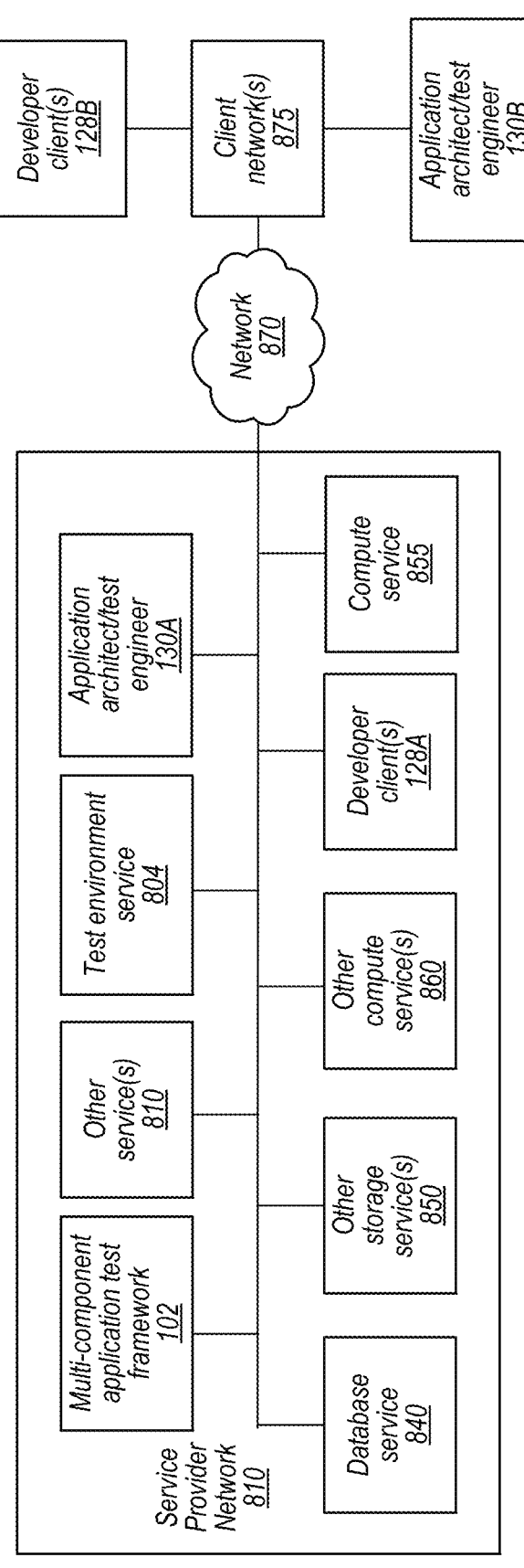
FIG. 8 illustrates a logical architecture of a multi-component application test framework in a service provider network, according to some embodiments.

FIG. 8 illustrates a logical architecture of a another(s) Multi-component application test framework in a service provider network, according to some embodiments. In the illustrated embodiment, nodes of the Service Provider Network 710 may host one or more services (e.g., service-provider provided services accessed by customers/clients or a customer's services may execute on the hosts of the service provider, or combinations thereof, etc.). In the illustrated embodiment, an Application architect client or Test engineer client 130 and/or Developer client (e.g., both external Application architect clients or test engineer clients 130B and Developer clients 128B, via a client network 875 or the like, and/or internal Application architect client or Test engineer client 130A and Developer clients 128A) may access the services of the service provider network 810 via network 870, for example.

In the illustrated embodiment, service provider network 810 hosts resources such as virtual compute instances and block-based storage, but also services such as Multi-component application test framework 102, other service(s) 810, Test environment service 804, Compute service 855, Database service 840, Other storage service(s) 850 (e.g., scalable object storage infrastructure, scalable, shared file storage service, durable, low-latency block-level storage volumes, etc.) and Other compute Service(s) 860, etc. Other services are also contemplated, without limitation.

Various components of, and associated with, the Multi-component application test framework 102 illustrated in FIG. 1 may be implemented in various combinations of the above-noted resources and/or services illustrated in FIG. 8. For instance, one or more of the Endpoint directory 116, Application registration and statues data store 118, Waypoint repository 120, and/or Application component code repository 124 may be implemented, at least partially, using the Database Service, 840, or Other Storage Service(s) 850. In some instances, one or more of the Application test workflow manager 122 and/or the Test interface 126 may be at least partially implemented on or across Other compute Service(s) 860 or Other services (810) for example.

In some embodiments, one or more portions of the Test environment 104 and or DNS 504, Region information provider 506 or Application configuration plane 508 may be implemented by some combination of the resources and/or services illustrated in FIG. 8. For example, business or other processing logic of a data repository may be implemented at a Compute service 855 or other Compute Service(s) 860 or Other Service(s) 810 and primary and/or secondary (e.g., backup) data stores may be implemented at any of Database Service, 840, or Other Storage Service(s) 850.

Example Computer System

Figure 9:
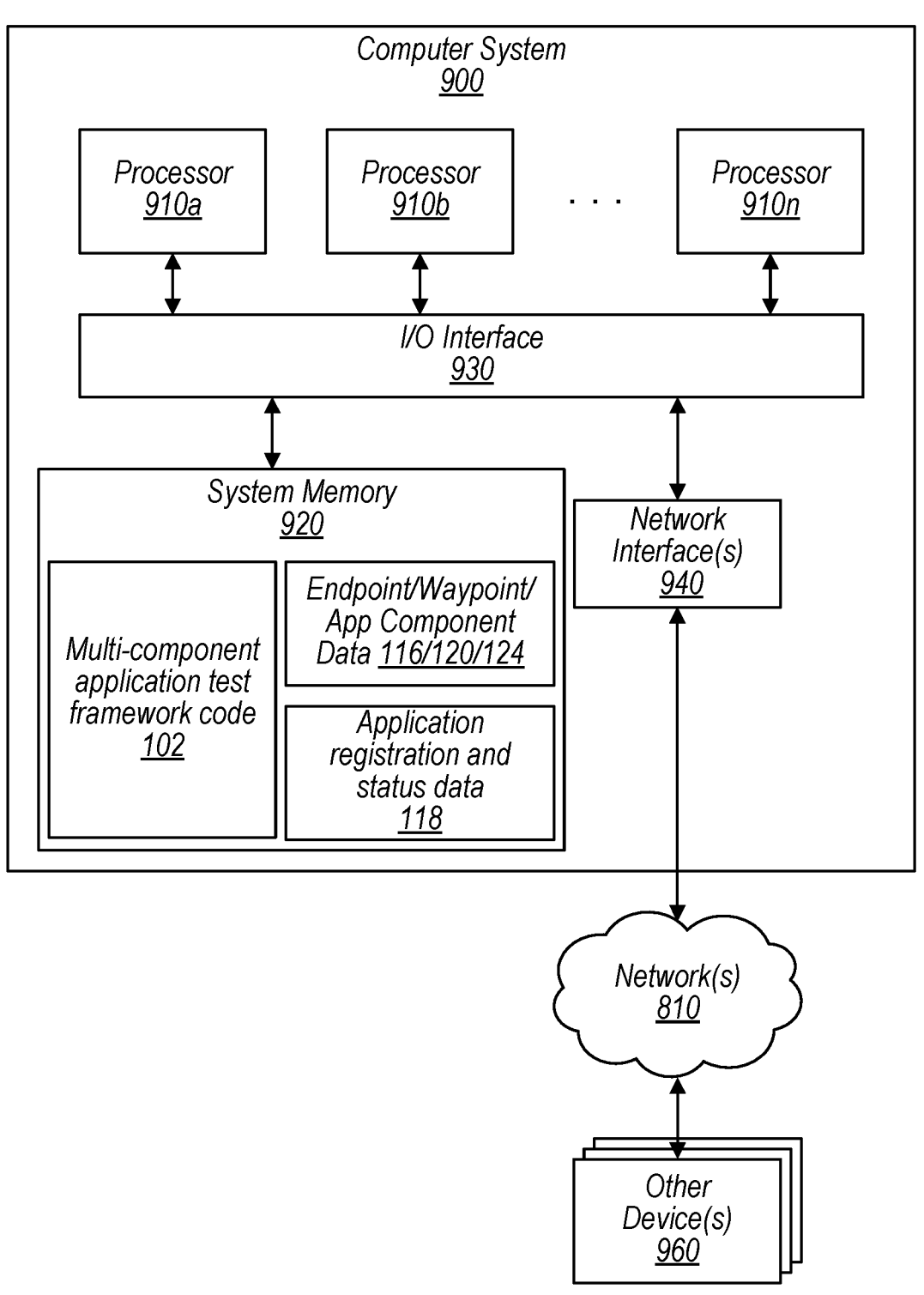
FIG. 9 illustrates an example of a computer system, one or more of which may implement various components that perform functionality described and illustrated throughout the disclosure, according to embodiments.

FIG. 9 illustrates an example of a computer system, one or more of which may implement various components that perform functionality described and illustrated throughout the disclosure, including testing of an application via a Multi-component application test framework, according to embodiments.

Various portions of systems in FIGS. 1, 4, 5, and 8 and/or methods presented in FIGS. 6, 7A, and 7B, in accordance with dependency graphs 2A-2D and/or a data structure in FIG. 3 stored in an Application registration and status data store 118 described herein, may be executed on one or more computer systems similar to that described herein, which may interact with various other devices of the system.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 960, such as cursor control device, keyboard, audio device, and display(s). In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for testing an application via a Multi-component application test framework may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 920 may be configured to store program instructions and/or data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for testing of an application via a Multi-component application test framework, are shown stored within system memory 920 as Multi-component application test framework code 102, Endpoint/Waypoint/Application component data 116/120/124 and Application registration and status data store 118, respectively. In other embodiments, program instructions and/or data may be received, sent, or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940. Program instructions may include instructions for implementing the techniques described with respect to any of the FIGS.

In some embodiments, I/O interface 930 may be configured to coordinate I/O traffic between processor 910, system memory 920, and any peripheral devices in the device, including network interface 940 or other peripheral interfaces, such as input/output devices. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network 810, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Computing device 900 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Memory 920 may include program instructions (e.g., such as Multi-component application test framework code 102) and various data (e.g., Endpoint/Waypoint/Application component data 116/120/124 and/or Application registration and status data 118) accessible by the program instructions 102. In one embodiment, program instructions 102 may include software elements of a method illustrated in the above figures. Data storage 116/118/120/124 may include data that may be used in embodiments described herein. In other embodiments, other or different software elements and/or data may be included.

Those skilled in the art will appreciate that computer system 900 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present solution may be practiced with other computer system configurations. In some embodiments, portions of the techniques described herein (e.g., techniques performed by a Multi-component application test framework) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computers comprising respective processors and memory configured to implement a multi-component application test framework configured to:

receive a test description for a multi-component application to be tested, the description identifying respective components of a plurality of components of the multi-component application and identifying dependencies between the plurality of components;

determine, based on the identified dependencies between the plurality of components, respective input and output waypoints for individual components of the plurality of components, wherein each input waypoints is configured to simulate one of the components that provides input to one or more other ones of the components, and each output waypoint is configured to simulate one of the components that receives output from one or more other ones of the components;

set endpoint information for components that have not been successfully tested to point to corresponding waypoints;

receive and deploy a particular component of the plurality of components for test, wherein the particular component looks up endpoint information for its component dependencies, wherein the endpoint information points to either waypoints or to successfully tested ones of the plurality of components; and responsive to successful testing of the particular component:

update the endpoint information for ones of the plurality of components dependent on the particular component to point to the particular component instead of an input or output waypoint corresponding to the particular component;

determine whether any active waypoints remain for dependencies between the plurality of components;

continue application testing if any active waypoints remain for dependencies between the plurality of components; and report successful completion of application testing if no active waypoints remain for dependencies between the plurality of components.

2. The system of claim 1, wherein:

the multi-component application test framework is configured to receive one or more different ones of the components for testing at different times, and each component is tested using other components or waypoints for its dependencies according to the endpoint information when the component is submitted for testing.

3. The system of claim 1, wherein the multi-component application test framework is configured to, responsive to successful testing of the particular component, deactivate waypoints corresponding the particular component.

4. The system of claim 1, wherein the multi-component application test framework is configured to:

subsequent to completion of the test:

receive one or more components, that were simulated in the test, for a second test, wherein at least one or more others of the components that are not yet received for the second test are simulated by a waypoint for the second test; and execute the second test such that each of the received one or more components is tested using other components or waypoints for respective dependencies according to the endpoint information when the received one or more components was submitted for testing via the second test.

5. The system of claim 1, wherein:

said set endpoint information for components that have not been successfully tested to point to corresponding waypoints comprises set the endpoint information in an endpoint directory data store;

said update endpoint information to point to the particular component instead of an input or output waypoint corresponding to the particular component comprises update the endpoint information in the endpoint directory data store; and the multi-component application test framework is configured to:

disseminate endpoint information from the endpoint directory data store to one or more component registries.

6. A method, the method comprising:

determining, by a multi-component application test framework implemented by one or more processors and based on dependencies, specified by a test description, between a plurality of components of a multi-component application to be tested, respective input and output waypoints for individual components of the plurality of components, wherein each input waypoint is configured to simulate one of the components that provides input to one or more other ones of the components, and each output waypoint is configured to simulate one of the components that receives output from one or more other ones of the components;

setting endpoint information, in an endpoint directory data store, for components that have not been successfully tested to point to corresponding waypoints;

deploying a particular component of the plurality of components for test, wherein the particular component looks up endpoint information for endpoints that point to either waypoints or to successfully tested ones of the plurality of components, for the particular component dependencies;

updating, responsive to successful testing of the particular component, the endpoint information, in the endpoint directory data store, for ones of the plurality of components dependent on the particular component to point to the particular component instead of an input or output waypoint corresponding to the particular component; and disseminating endpoint information from the endpoint directory data store to one or more component registries.

7. The method of claim 6, further comprising:

subsequent to completion of the test:

receiving one or more components, that were simulated in the test, for a second test, wherein at least one or more others of the components that are not yet received for the second test are simulated by a waypoint for the second test; and executing the second test such that each of the received one or more components is tested using other components or waypoints for respective dependencies according to the endpoint information when the received one or more components was submitted for testing via the second test.

8. The method of claim 6, further comprising generating, responsive to unsuccessful testing of the particular component, a report of test failures and leave waypoints corresponding to the particular component in place so that the ones of the plurality of components dependent on the particular component will interact with respective ones of the waypoints corresponding to the particular component for testing.

9. The method of claim 8, further comprising:

obtaining, during runtime and by the particular component from the one or more component registries, the endpoint information for endpoints that point to either waypoints or to successfully tested ones of the plurality of components; and invoking, during runtime and by the particular component, the obtained endpoint information.

10. The method of claim 6, wherein to simulate one of the components that provides input to one or more other ones of the components, a respective input waypoint is configured to perform:

synthesizing test data to provide as input to the one or more other components; or replaying captured production data as input to the one or more other components.

11. The method of claim 6, further comprising verifying, by respective ones of the output waypoints, the output from one or more other ones of the components according to test criteria.

12. The method of claim 6, further comprising:

performing registration and testing of another multi-component application at least partially in parallel with the registration and testing of the multi-component application, wherein performing testing comprises:

determining active waypoints remain for dependencies between a plurality of components of the other multi-component application; and continuing, based on determining active waypoints remain for dependencies between a plurality of components of the other multi-component application, application testing of the remaining active waypoints.

13. One or more non-transitory computer-readable media storing program instructions executable on or across one or more processors to implement a multi-component application test framework configured to perform:

determining, by a multi-component application test framework and based on dependencies, specified by a test description, between a plurality of components of a multi-component application to be tested, respective input and output waypoints for individual components of the plurality of components, wherein each input waypoint is configured to simulate one of the components that provides input to one or more other ones of the components, and each output waypoint is configured to simulate one of the components that receives output from one or more other ones of the components;

setting endpoint information for components that have not been successfully tested to point to corresponding waypoints;

deploying a particular component of the plurality of components for test, wherein the particular component looks up endpoint information for endpoints, that points to either waypoints or to successfully tested ones of the plurality of components, for the particular component dependencies;

responsive to successful testing of the particular component:

updating the endpoint information for ones of the plurality of components dependent on the particular component to point to the particular component instead of an input or output waypoint corresponding to the particular component;

determining whether any active waypoints remain for dependencies between the plurality of components;

continuing application testing if any active waypoints remain for dependencies between the plurality of components; and reporting successful completion of application testing if no active waypoints remain for dependencies between the plurality of components.

14. The one or more non-transitory computer-readable media of claim 13, wherein the program instructions cause the multi-component application test framework to perform:

receiving one or more different ones of the components for testing at different times; and testing each of the received one or more different components using other ones of the components or waypoints for respective component dependencies according to the endpoint information when the one or more different components is submitted for testing.

15. The one or more non-transitory computer-readable media of claim 13, wherein the program instructions cause the multi-component application test framework to perform, deactivating, responsive to successful testing of the particular component, waypoints corresponding the particular component.

16. The one or more non-transitory computer-readable media of claim 13, wherein:

the program instructions cause the multi-component application test framework to perform receiving component descriptions for the plurality of components; and setting endpoint information for components that have not been successfully tested comprises initializing an endpoint directory with waypoints for each untested component and propagating the endpoint information to other lookup systems per the component descriptions.

17. The one or more non-transitory computer-readable media of claim 13, wherein the program instructions cause the multi-component application test framework to perform:

initiating the test of the particular component; and responsive to the particular component passing the test, updating, in an application component status data store of the multi-component application test framework, a status for the particular component to indicate the particular component passed the test, wherein status of one or more others of the components of the multi-component application remain set to a planned, a failed, or a released status.

18. The one or more non-transitory computer-readable media of claim 13, wherein the program instructions cause the multi-component application test framework to perform:

obtaining, during runtime and by the particular component from one or more component registries, endpoint information for the endpoints that point to either waypoints or to successfully tested ones of the plurality of components; and invoking, during runtime and by the particular component, the obtained endpoint information.

19. The one or more non-transitory computer-readable media of claim 13, wherein the program instructions cause the multi-component application test framework to perform:

determining, based on an analysis of elimination of the waypoints of the multi-component application, whether all components of the multi-component application have been merged; and reporting, based on a determination that all components of the multi-component application have been merged, overall application integration test complete.

\* \* \* \* \*